Aug. 29, 1950     S. G. SHAND ET AL     2,520,288
PLUG COCK

Filed July 24, 1944     2 Sheets-Sheet 1

INVENTORS
Stanley Grapes Shand
& Richard Hector Price
BY *A. R. Odell*
Attorney

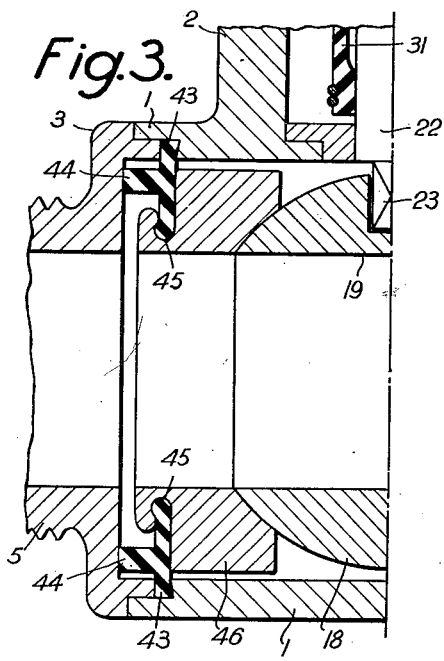
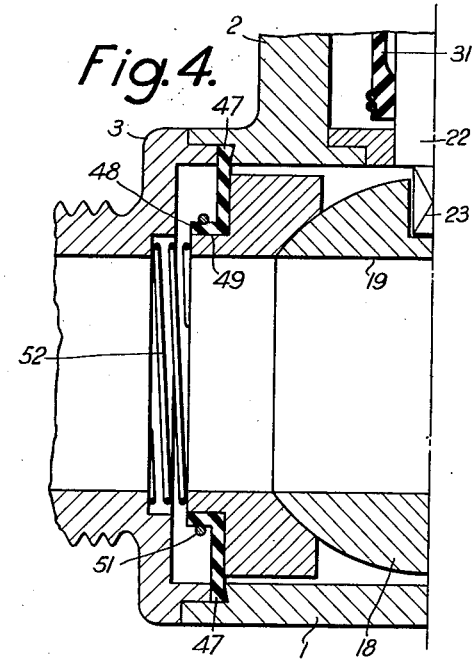
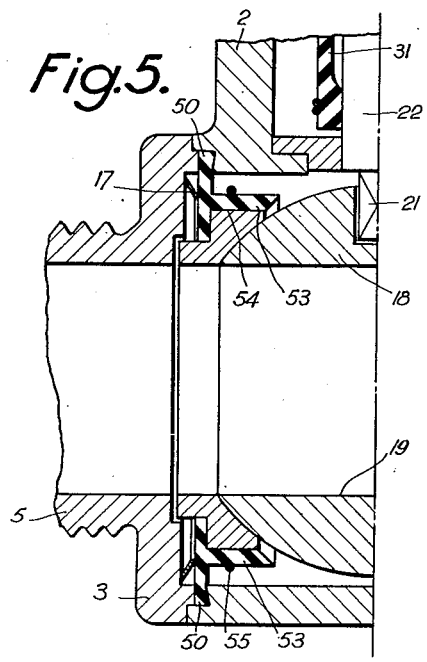
INVENTORS
Stanley Grapes Shand
& Richard Hector Price
BY *A.J. Cowell*
Attorney

UNITED STATES PATENT OFFICE 2,520,288

PLUG COCK

Stanley Grapes Shand and Richard Hector Price, Cwmbran, Newport, England, assignors to Saunders Valve Company Limited, Cwmbran, Newport, England, a corporation of Great Britain Application July 24, 1944, Serial No. 546,240
In Great Britain July 28, 1943

3 Claims. (Cl. 251—113)

This invention relates to valves or cocks for controlling the flow of a fluid; and in particular to cocks which comprise a plug rotatable within a casing to bring a transverse bore through the plug into or out of register with inlet and outlet openings in the casing.

More specifically the invention is concerned with cocks of this class in which plug seatings conforming to a surface of revolution formed upon the plug are resiliently mounted in the casing in line with its inlet and outlet openings, so as to be pressed firmly into contact with the plug and thereby make a fluid-tight joint with it around its transverse bore or around an unbored part of the plug surface according to the position to which the plug is turned.

One object of the invention is to produce a plug cock of this kind which can be operated by a moderate torque under all conditions of atmospheric temperature.

A further object of the invention is a plug cock which will not stick even when used for such fluids as gasoline.

Yet another object of the invention is a plug cock which will not leak even under considerable hydraulic pressure.

Yet another object of the invention is a plug cock built of independently replaceable parts which are readily assembled and stripped, so that damaged cocks have a high scrap value.

A particular feature of the invention is a novel form of resilient seating for the plug of a plug cock. Another feature of the invention is an improved mounting for the spindle by which the plug is turned.

These and other objects and features of the invention will be made clear by a description of typical embodiments of the invention, illustrated by way of example in the accompanying drawings.

In these drawings—

Figures 3 and 4 illustrate on a smaller scale alternative forms of resilient mounting for the plug seats.

Figure 5 shows on a smaller scale yet another form of resilient mounting for the plug seats.

Figure 1:
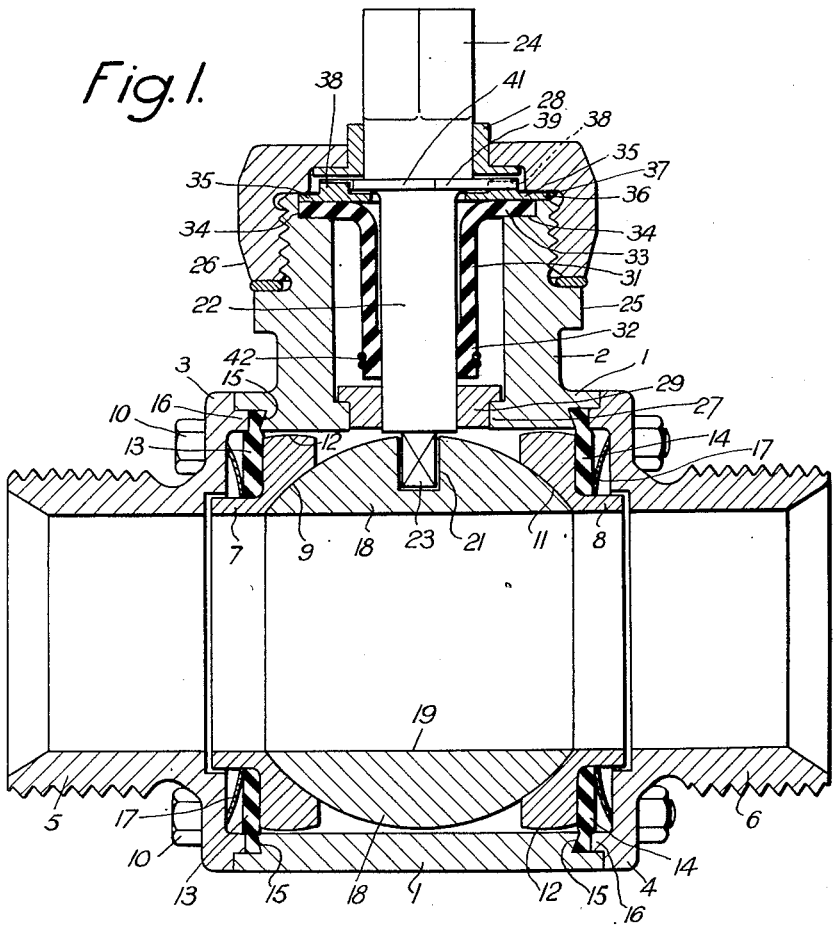
Figure 1 is an elevation of a plug constructed according to the invention, in section on a plane containing the axis of the plug and the axis of the fluid channel controlled by the plug.
Figure 2:
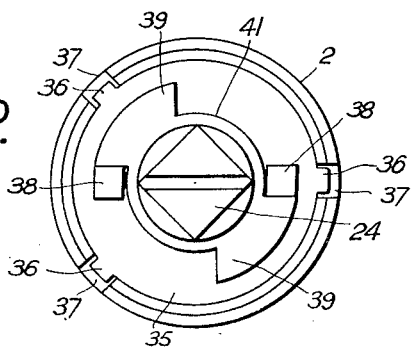
Figure 2 is a plan of the spindle mounting with an enclosing cap removed.

In the construction shown in Figures 1 and 2 the body 1 is a hollow casting, in the main of square cross section, without integral end walls, and from one side of it projects a hollow cylindrical extension 2. The ends of the body are closed by the abutting and spigoting flanges 3, 4 of pipe connections 5, 6, screw-threaded or otherwise adapted for attachment to pipes conveying liquid or to apparatus to be supplied with liquid. Within the body are plug seatings 7, 8, having apertures of substantially the diameter of the pipe connections 5, 6 and having surfaces of revolution 9, 11, formed on their inner ends to fit the plug of the cock. The seatings 7, 8 may be of metal, but, particularly for use with gasoline, it is preferred to make them of plastic. The seatings are annular, fit freely in the body 1, and are preferably rounded at their periphery 12, so that they may freely rock in any direction. They are located within the body, and a joint tight under fluid pressure is made with them, by diaphragms of rubber or rubber substitute 13, 14. In the construction shown in Figures 1, 2 and 5 these diaphragms are simply flat annuli the peripheries of which are tightly gripped between a shoulder 15 on the body 1 and the respective spigoting ribs 16 on the end flanges 3 and 4 when the flanges are drawn together upon the body by the bolts 10. The surfaces of the shoulder 15 and rib 16 are mutually inclined, diverging outward, the better to secure the periphery of the diaphragms 13 and 14. Sealing contact between the diaphragms 13 and 14 and the seatings 7 and 8 is maintained in the absence of fluid pressure, and the seatings are kept pressed against the plug, by suitable springs compressed between the flanges 3, 4 and the seatings 7, 8; in Figure 1 these springs take the form of dished resilient discs 17, bearing at their inner edge upon the diaphragms 13, 14 and at their peripheries upon the end plates 3 and 4.

While the plug of the cock may be cylindrical or conical in shape, it is shown in the embodiments here illustrated as spherical. It consists of a metal sphere 18 with a wide transverse bore 19 through it of substantially the diameter of the pipe connections 5, 6, and a slot or recess 21 in it of non-circular section to receive the end of an operating spindle.

In the constructions shown the operating spindle 22 is independent of the plug. It is housed in the extension 2 of the body 1. The body of the spindle is cylindrical; its inner end 23 is of non-circular section, for instance a flattened tongue, fitting the recess or slot 21 in the plug 18; its outer end 24 is also of non-circular section, for instance square, to receive an operating arm (shown only in Figure 5), which may be a handle for immediate manual actuation or an arm actuated from a distance through any suitable linkage; or the squared end 24 could receive the correspondingly formed end fitting on a flexible shaft by which a twist could be conveyed to the spindle from a distance. The slot 21 lies parallel with the direction of fluid pressure when the cock is closed, so that the tongue 23 does not hinder displacement of the ball 18 under pressure to the extent permitted by its seatings and seating diaphragms.

The extension 2 is flanged at 25 and threaded at its outer end to receive a screw cap 26; it is also formed with an inwardly extending lip 27 at its inner end. The operating spindle 22 is supported within the extension 2 of the body by a bush 28 in the cap 26 and preferably also by a bush 29 resting on the lip 27.

A tight joint is made about the spindle 22 by a rubber or like flexible and resilient sleeve 31, which preferably closely fits the spindle 22 at its lower end 32, loosely fits the spindle elsewhere, and at its upper end is expanded into a flange 33, the periphery of which lies in a recess 34 in the end of the extension 2 and is gripped between the end of the extension and a washer 35 pressed upon it by the screw cap 26.

The washer 35 fits within the recess 34; but in order that it may serve a second purpose next to be described it is formed with tongues 36 projecting beyond the circular periphery of the recess 34 and lodged in notches 37 in the wall surrounding the recess; it is thus prevented from turning. The notches 37 and tongues 36 not being evenly spaced around the periphery there is only one position in which the washer can be placed in the recess 34. On its upper surface are projecting abutments 38. These co-operate with the projecting tongues 39 of a collar 41 integral with the spindle 22 and located in the plane of the abutments.

The lower end 32 of the sleeve 31 may be secured upon the cylindrical body of the spindle 22 by circlips or a wire winding 42. It is preferably secured in such an angular position that it is unstressed when the cock is half open; it has thus only to suffer a twist of 45° in the full opening or complete closing of the cock. The restoring torque thereby arising will ordinarily be insufficient to overcome the friction between the plug and its seatings under the pressure of the liquid.

While the cock is open the pressure of the liquid comes upon the outer faces of the diaphragms 13 and 14, presses them into firm contact with the seatings 7 and 8, and the seatings into firm contact with the plug 18. If any liquid should find its way into the extension 2 of the body it will but press the sleeve 31 the more firmly against the body. While the cock is closed the liquid pressure on the upstream diaphragm presses that diaphragm against the adjacent seating, the seating against the plug, the plug against the downstream seating, and the downstream seating against the downstream diaphragm and its spring.

It will be noted that the diaphragms 13 and 14 can yield by bending and not merely by compression. On this account they provide a very flexible mounting for the seatings 7 and 8. They ensure that the plug will not stick in the seating, for if there is incipient sticking they yield sufficiently to allow the seating to follow the plug a little and assume a slightly inclined position, in which the restoring forces are concentrated at a part of the seating and tear it off the plug. They ensure fluid tightness, since they are themselves subject to the fluid pressure, and yield to it by bending and not merely by volume compression, and so are applied to the seatings the more firmly the greater the fluid pressure.

It will be seen that the integers of which the cock is built up are readily replaceable if damaged. The cap 26, spindle 22, sleeve 31 and washer 35 can be removed and replaced while the cock is in use upon a supply system. The end flanges 3 and 4 can be replaced if damaged, and by removal of one of them the adjacent spring 17, diaphragm 13 or 14, and seating 7 or 8 may be reached and removed, and thereafter the plug 18 may be removed.

The design of the diaphragm may be varied to adapt it to different circumstances, and in particular to different fluid pressures. Figure 3 shows a diaphragm which is in form a flat annulus 43 with a cylindrical part 44 projecting from its rear surface. The periphery of the annulus is clamped, as in Figure 1, between the body 1 of the cock and the end flange 3. The cylindrical part 44 fits within the end flange 3 and under pressure will make a fluid-tight joint with it. The inner margin of the annulus 43 is received in a recess 45 in the seating 46, and is retained by peening inward the outer lip of the recess as indicated.

In Figure 4 the diaphragm is an annulus 47 of L section, its cylindrical part 48 fitting a cylindrical outer surface 49 turned on the seating and being secured thereon by a circlip 51. A helical or other spring 52 maintains pressure between seating and plug whether or not there is any fluid pressure.

Figure 6 shows a form of diaphragm consisting of a flat annulus 50 with a cylindrical part 53 projecting from its inner face, fitting a cylindrical surface 54 upon the seating, and secured thereon by a circlip 55. The diaphragm is backed by a spring 17 such as described with reference to Figure 1.

These are examples only of the modifications which may be made in the invention, the scope of which is to be gathered from the appended claims.

We claim:

1. A plug cock comprising a casing having a passage extending therethrough and open at each end, a plug rotatably mounted within said casing intermediate the ends of said passage for rotation about an axis perpendicular to the passage, end plates detachably mounted on the casing at each end of said passage and provided with flow openings, an annular seat element loosely mounted in said passage between one end plate and the plug, an annular seat element loosely mounted in said passage between the other end plate and the plug, said annular seat elements having flow openings aligned with the flow openings in the end plates and said plug having a bore perpendicular to its axis of rotation adapted to register with the flow openings in the seat elements in one position of rotation, said seat elements being spaced from their corresponding end plates to provide communication between the flow openings in the end plates and the outer end surfaces of said seat elements adjacent the end plates, and a plate of flexible sealing material disposed at each end of the casing and clamped adjacent its outer peripheral edge between the end of the casing and the corresponding end plate, said plates of flexible sealing material having central openings therein larger than and aligned with the flow openings in the seat elements and having the portions thereof adjacent the central opening disposed in contact with the outer end surfaces of the seat elements whereby fluid pressure in the flow openings will urge the central portions of the flexible plates into sealing engagement with the said outer end surfaces of the seat elements, and resilient means interposed between the end plates and flexible plates urging the portions of the latter adjacent the central openings therein, against the seat elements.

2. A plug cock comprising a casing having a passage extending therethrough and open at each end, a plug rotatably mounted within said casing intermediate the ends of said passage for rotation about an axis perpendicular to the passage, end plates detachably mounted on the casing at each end of said passage and provided with flow openings, an annular seat element loosely mounted in said passage between one end plate and the plug, an annular seat element loosely mounted in said passage between the other end plate and the plug, said annular seat elements having flow openings aligned with the flow openings in the end plates and said plug having a bore perpendicular to its axis of rotation adapted to register with the flow openings in the seat elements in one position of rotation, said seat elements being spaced from their corresponding end plates to provide communication between the flow openings in the end plates and the outer end surfaces of said seat elements adjacent the end plates, and a plate of flexible sealing material disposed at each end of the casing and clamped adjacent its outer peripheral edge between the end of the casing and the corresponding end plate, said plates of flexible sealing material having central openings therein larger than and aligned with the flow openings in the seat elements and having the portions thereof adjacent the central opening disposed in contact with the outer end surfaces of the seat elements whereby fluid pressure in the flow openings will urge the central portions of the flexible plates into sealing engagement with the said outer end surfaces of the seat elements, and an axial tubular portion projecting from each seat element through the central opening of the flexible plate toward the adjacent end plate.

3. A plug cock comprising a casing having a passage extending therethrough and open at each end, a plug rotatably mounted within said casing intermediate the ends of said passage for rotation about an axis perpendicular to the passage, end plates detachably mounted on the casing at each end of said passage and provided with flow openings, an annular seat element loosely mounted in said passage between one end plate and the plug, an annular seat element loosely mounted in said passage between the other end plate and the plug, said annular seat elements having flow openings aligned with the flow openings in the end plates and said plug having a bore perpendicular to its axis of rotation adapted to register with the flow openings in the seat elements in one position of rotation, said seat elements being spaced from their corresponding end plates to provide communication between the flow openings in the end plates and the outer end surfaces of said seat elements adjacent the end plates, a plate of flexible sealing material disposed at each end of the casing and clamped adjacent its outer peripheral edge between the end of the casing and the corresponding end plate, said plates of flexible sealing material having central openings therein larger than and aligned with the flow openings in the seat elements and having the portions thereof adjacent the central opening disposed in contact with the outer end surfaces of the seat elements whereby fluid pressure in the flow openings will urge the central portions of the flexible plates into sealing engagement with the said outer end surfaces of the seat elements, resilient means interposed between the end plates and flexible plates urging the portions of the latter adjacent the central openings therein, against the seat elements, and an axial tubular portion projecting from each seat element through the central opening of the flexible plate toward the adjacent end plate.

STANLEY GRAPES SHAND.
RICHARD HECTOR PRICE.

REFERENCES CITED

The following references are of record in the file of this patent:

UNITED STATES PATENTS

| Number | Name | Date |
|---|---|---|
| 1,330,429 | Campbell | Feb. 10, 1920 |
| 1,616,386 | O'Stroske | Feb. 1, 1927 |
| 1,807,139 | Volodimirov | May 26, 1931 |
| 1,879,481 | Putnam | Sept. 27, 1932 |
| 2,173,949 | Neveu | Sept. 26, 1939 |
| 2,191,232 | Heinen | Feb. 20, 1940 |
| 2,201,895 | Glen | May 21, 1940 |
| 2,297,161 | Newton | Nov. 15, 1938 |

FOREIGN PATENTS

| Number | Country | Date |
|---|---|---|
| 44,522 | Netherlands | Nov. 15, 1938 |
| 167,585 | Switzerland | May 16, 1934 |